United States Patent
Doiron et al.

[19]

[11] Patent Number: 6,128,483
[45] Date of Patent: *Oct. 3, 2000

[54] SIMULTANEOUS OVER THE AIR DATA DOWNLOAD TO MULTIPLE RADIOS

[75] Inventors: Timothy J. Doiron, Forest, Va.; Steven T. Dreon, Ballwin, Mo.

[73] Assignee: Ericsson, Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/752,630

[22] Filed: Nov. 19, 1996

[51] Int. Cl.$^7$ ...................................................... H04B 1/26
[52] U.S. Cl. ............................ 455/419; 455/420; 455/432
[58] Field of Search ..................................... 370/346, 349, 370/449, 394; 340/825.01; 455/419, 420, 432, 435, 436

[56] References Cited

U.S. PATENT DOCUMENTS

| | | |
|---|---|---|
| 4,254,504 | 3/1981 | Lewis et al. . |
| 4,525,865 | 7/1985 | Mears . |
| 4,817,190 | 3/1989 | Comroe et al. . |
| 4,910,510 | 3/1990 | Davis et al. . |
| 4,916,539 | 4/1990 | Galumbeck . |
| 4,975,693 | 12/1990 | Davis et al. . |
| 5,025,252 | 6/1991 | DeLuca et al. . |
| 5,086,513 | 2/1992 | Lawrence et al. . |
| 5,109,403 | 4/1992 | Sutphin . |
| 5,297,192 | 3/1994 | Gerszberg . |
| 5,381,479 | 1/1995 | Gardeck et al. . |
| 5,483,465 | 1/1996 | Grube ........................................ 455/419 |
| 5,603,084 | 2/1997 | Henry ....................................... 455/419 |
| 5,678,197 | 10/1997 | Grube ....................................... 455/436 |
| 5,761,618 | 6/1998 | Lynch ....................................... 455/419 |

*Primary Examiner*—Ajit Patel
*Assistant Examiner*—Ricardo M. Pizarro
*Attorney, Agent, or Firm*—Nixon & Vanderhye P.C.

[57] ABSTRACT

In a multi-point mobile radio broadcast network, the multiple mobile radios can have personality information reprogrammed via a broadcast method, rather than on a one-to-one basis. A communications manager, which controls the communications between the various mobile radios can change the personality information contained in each radio by broadcasting that information to the radios as a group. After receiving the new personality information, a processor within the mobile radios can remove the unique identification codes associated with that particular radio from the old personality information, imported into the new personality information communicated to it by the communication manager, and store the new personality information with the newly incorporated unique identification codes into a local memory. The protocol for broadcasting the personality information to the mobile radios is important to ensure that the mobile radios receive the new personality information. It is also important that the communication manager have assurances that the mobile radios properly receive the new personality information, without requiring the mobile radios to communicate multiple acknowledgments one-by-one to the communication manager. Accordingly, broadcast sessions are initiated by a repetitious broadcast control signal, then group data is broadcast without acknowledgments to the mobile radios. On the last data broadcast, the communication manager requests an acknowledgment, which is returned one-by-one from each mobile radio. Finally, a disconnect broadcast session control signal is then repetitiously broadcast to the radios.

40 Claims, 11 Drawing Sheets

SIMULTANEOUS OVER THE AIR DATA DOWNLOAD TO MULTIPLE RADIOS

BACKGROUND OF THE INVENTION

The present invention relates to a multi-radio broadcast communication system. More particularly, the present invention relates to a system for reprogramming radio personality information in a multi-point radio system using a significantly reduced instruction set. In multi-point mobile radio communication systems, each radio contains radio personality information identifying the broadcast parameters for the particular radio, and a unique identification code distinctively identifying each respective radio from all of the other radios in the system. In multi-radio wireless broadcast systems, information from a broadcast manager can be used to reprogram radio personality information in the respective radios. In particular, wireless radio personality information downloads can be made in a one-to-one basis over the air to each individual radio from the communication manager. That is, a desired file and/or information is downloaded to each radio from the communication manager individually over the wireless packet-data network. This is true even though many groups of radio users may use the same radio personality files in multiple radios with the only exception being the unique identification code for the respective radios. The unique identification code is sometime referred to as the "logical ID" code. The logical ID code is a unique identification number that distinguishes one radio from another to the communication manager.

Multi-point radio broadcast systems are commercially available. For example, Ericsson, the assignee of the present application, commercially sells "EDACS" radios which can reliable receive wireless broadcast information from a communication manager, such as Ericsson's commercially available "Profile Manager." With the EDACS radio, information is broadcast to the radios from the communication manager via a packet data network.

As will be understood to those of skill in this art, the packet data network includes a packet transport layer comprising transfer units. As shown in FIG. 19, the packet transport layer is, in the present OSI standard one of seven layers. Of course, alternative standards can be used with the present invention, if desired. At the highest level of the packet network of FIG. 19 is the application layer. As is well-known, the application layer prepares messages, which are progressively imbedded with various headers through to the transport layer. The transport layer is a focus of the example embodiments of the present invention, as described below. Following the transport layer, the messages are packeted in the network layer, lumped into frames in the data link layer and then routed onto the network connection by the hardware layer. The hardware layer connects the client to the server via the network connection, such as the Ethernet. The frames are received by the client or server and are then unpacked by a regional application up to the application layer, where the messages are used.

In Ericsson's commercial Profile Manager, the transport units include instructions which were delivered radio-by-radio to reprogram the radio personality information on the respective radios, without a need for a wire cable connection. While this profile transport layer is effective, any improvements in throughput on the system-wide level are valuable. For example, if a 9,040 byte personality file is to be delivered to one hundred radios, a total of 37 minutes is required. This can be calculated as follows. Since 452 bytes can be sent per packet, 20 data packets are required for the 9,040 byte personality file. Two data packets are required to initialize communication on a one-to-one basis with the individual radios (one packet to initialize and one packet to acknowledge the initiation) and two packets are required to disconnect the communication, the total data packets required is 100 (2 initial+20 data+20 data acknowledgments+2 disconnect)=4,400 total packets. At 500 milliseconds per packet, the total time required to transmit the 4,400 packets is 37 minutes.

The system that can deliver the same 9,040 byte personality file to, for example, the 100 radios, in significantly less time is desirable.

SUMMARY OF THE INVENTION

With the present invention, a communication manager (such as Profile Manager) can download the same information to the multiple radio simultaneously using a combination of broadcast packet data calls and individual data calls, saving enormous amounts of time and cost. With the present invention, a customer can update the personality information simultaneously in multiple radios without having to download it on a one-to-one basis. In accordance with the present invention, a packet data network is utilized in which the transport layer includes transfer packets providing a mechanism for transferring data to multiple radios simultaneously in a single broadcast session. Instead of transferring data to one radio at a time, the broadcast session permits more of the multiple radios to receive the requisite personality files in significantly shorter amounts of time.

In accordance with the present invention, the communication manager initiates a broadcast session with a plurality of portable radios using a broadcast initiate transfer unit on the packet data network. The initial broadcast transfer unit is broadcast a plurality of times to the multiple radios, thus ensuring that the multiple radios each receive the initial broadcast transfer unit. Also, because the initial broadcast transfer unit is repeated a plurality of times, the communication manager can be assured that the multiple radios each received the initial broadcast instruction, without having to record acknowledgments from each of the multiple radios to the communications manager. Thus, no air time is wasted by individual response messages sent from the mobile radios to the communication manager in order to initialize the broadcast session.

Next, data is transferred in a broadcast mode from the communication manager to all of the multiple radios over the packet data network. The data transfer units include the personality file to be delivered to each of the mobile radios. Because the personality files will generally require more than one packet of data, multiple data transfer units are utilized to broadcast the full personality file to the respective mobile radios. On the last data packet of the personality file, the data transfer unit switches to an acknowledgment request data transfer unit broadcast from the communication manager to the multiple mobile radios. This acknowledge request data transfer unit is generally the same as the data transfer unit except that it requests an acknowledgment of the correct transmission of all of the previous data transfer units.

Following the acknowledge request data transfer unit, each mobile radio responds to the communication manager by broadcasting its own individualized acknowledgment of the sequence of data transfer units previously received. This is the only required acknowledgment from the mobile radios to the communication manager and is also the only required transmission on a one-to-one basis from the mobile radios to the communication manager. At the termination of the acknowledgments, the communications manager broadcasts a disconnect broadcast unit to each of the mobile radios informing the mobile radios that the broadcast session is completed. This disconnect broadcast unit is communicated a plurality of times from the communication manager to the mobile radios to ensure that the mobile radios receive the disconnect command, without having to acknowledge receipt of such.

Once the mobile radios receive the personality file in the form of the data transfer units and the acknowledge request data transfer unit, each individual mobile radio assembles the personality file from the packets of information and then adds its own unique logical identification code to the personality file. The combination of the broadcast and personality file with the unique logical identification code for each mobile radio forms the unique personality information stored by each mobile radio in the system.

With the present invention, substantial savings in broadcast time can be realized. For example, the 9,040 byte personality file described previously to be delivered to one hundred radios can be delivered in 1.9 minutes (versus the 37 minutes required by the system described above). Assuming, for example, that 5 initial broadcast transfer units and 5 disconnect broadcast units are transmitted from the communication manager to the multiple radios, the total packets transmitted is 5 initial packets plus 19 broadcast data packets plus 100 acknowledge data packets plus 100 acknowledgments plus 5 disconnect packets=229 total packets. At this same 500 millisecond per packet delivery rate, the total time to deliver the 229 packets is 1.9 minutes. As can be seen from this example, the broadcast time required to reprogram the radio personality information for the 100 radios (or for any number of radios in a multi-point broadcast system) is substantially reduced by the present invention.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION OF THE PRESENTLY PREFERRED EMBODIMENT

The following is an example embodiment of one way in which the present invention can be realized.

Figure 1:
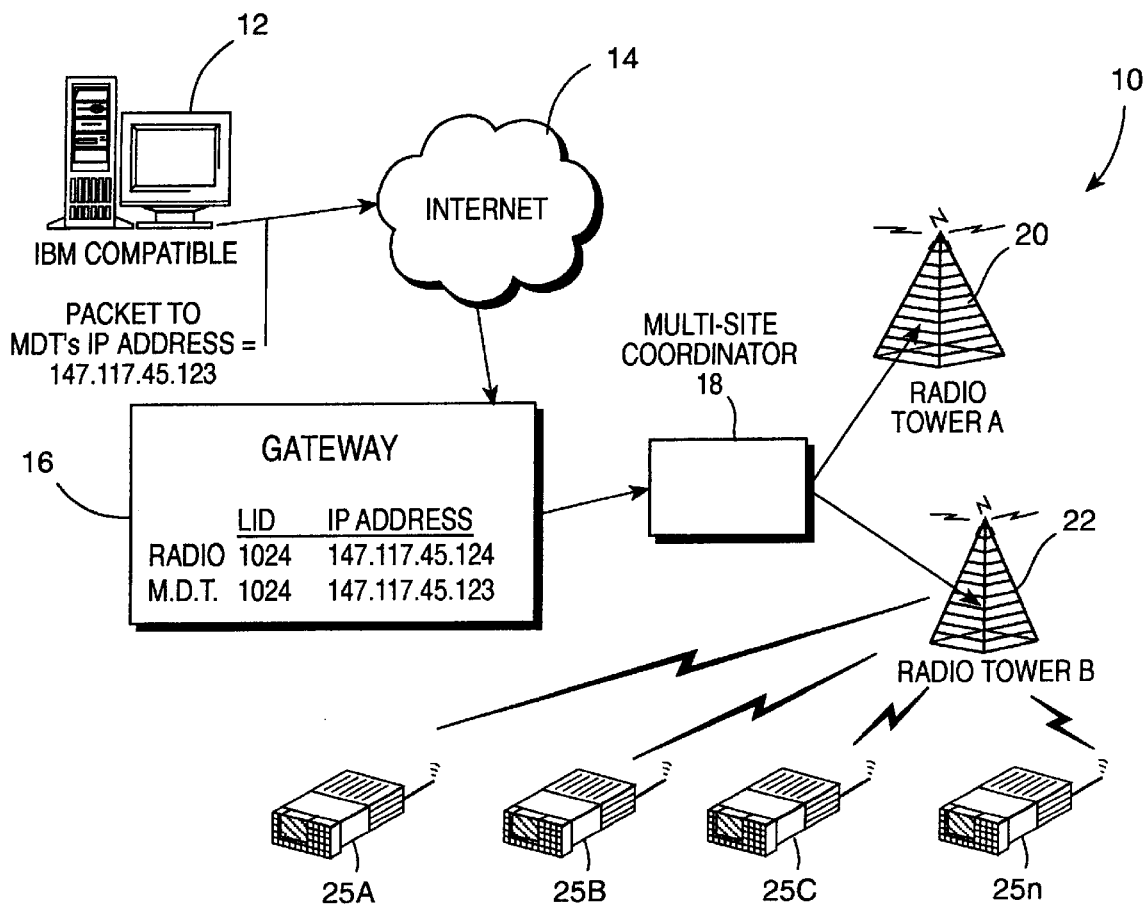
FIG. 1 is a schematic diagram of a multi-point radio system.

A mobile radio communication system 10 includes a communication manager 12 communicating directly to or via an Internet 14 network to a communication gateway 16. The gateway 16 communicates with a multi-site coordinator 18 which communicates through one or more radio sites 20/22 to multiple mobile radios 25a, 25b, 25c, . . . 25n. The communication manager 12 can be a communication management application operating on a standard personal computer, as shown in FIG. 1. In the present invention, the communication manager 12 controls the reprogramming of the personality information in the multiple mobile radios 25a–25n via the various communication components (internet 14, gateway 16, multi-site coordinator 18, and radio towers 20/22).

The system shown in FIG. 1 is a wireless data packet network. The communication manager 12 communicates via Ethernet and the Internet Protocol (IP) to the gateway 16. The gateway 16 may be an Ericsson data gateway, which has communication links established to various sites through the multi-site coordinator 18. The gateway and multi-site coordinator allow packet switched data to be transmitted either individually or through group calls over the wireless network to or from the radios 25a–25n.

One application of the present invention is the ability of the communication manager 12 to change the personality information in the respective radios 25a–25n, without requiring the communication manager 12 to communicate individually with each of the respective radios 25a–25n. To accomplish this, certain of the personality information is sent to the radios 25a–25n in a broadcast or so-called "group-call" mode.

Figure 2:
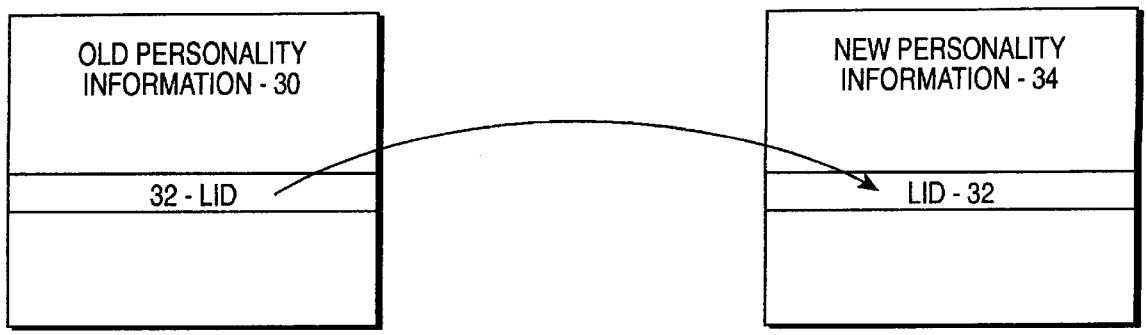
FIG. 2 is a schematic diagram of radio personality information.

The personality information is a definitional code that sets certain unique radio characteristics. In some embodiments, those characteristics can include, but are not limited to: the frequency at which the radio operates, the talk groups in which the radio operates, available phone lists for the radio, available call interrupt features, etc. In general, radio personality information is described in U.S. Pat. No. 5,086,513 (issued Feb. 4, 1992 to Lawrence et al.); U.S. Pat. No. 4,525,865 (issued Jun. 25, 1985 to Mears); and U.S. Pat. No. 4,254,504 (issued Mar. 3, 1981 to Lewis et al.). which are incorporated herein by reference. For groups of radios with common personality information (with the exception of the logical identification code (LID) for each respective radio), the personality information can be broadcast to the group of radios by the communication manager 12, without requiring the communication manager to correspond individually to any particular radio. As shown in FIG. 2, each radio is loaded with old personality information 30 including a unique logical identification code 32. Once new personality information 34 is broadcast to a set of multiple mobile radios, the multiple mobile radios transfer their unique logical identification code 32 into the new personality information 34, and store the combination of the new personality information 34 with the original logical identification code 32. In this manner, new personality codes with unique logical identification codes do not have to be processed individually by the communication manager 12 nor broadcast individually to the mobile radios.

Unfortunately, sending the new personality information 34 to multiple mobile radios is not as simple as simply broadcasting the information to them. Several problems must be addressed in attempting to change the personality information of a group of mobile radios, which problems are addressed by the present communication protocol. First, personality information was transmitted individually to mobile radios by prior art communication managers because the communication manager 12 had to be assured that each individual mobile radio 25a–25n properly received the new personality information 34 before subsequent transmissions occurred by the particular mobile radio. By communicating one-on-one with the mobile radios 25a–25n, the communication manager 12 could ensure that the personality information 34 was properly loaded by each respective mobile radio before the reprogramming session ended. With a broadcast system, however, it is more difficult for the communication manager 12 to be assured that each mobile radio in the broadcast session properly received and stored the new personality information 34. As a result, the present invention uses a communication protocol that gives the communication manager 12 good assurance that each of the mobile radios 25a–25n has properly received the new personality information 34 during a reprogramming session, even though the new personality information is simultaneously broadcast to multiple radios.

Figure 3:
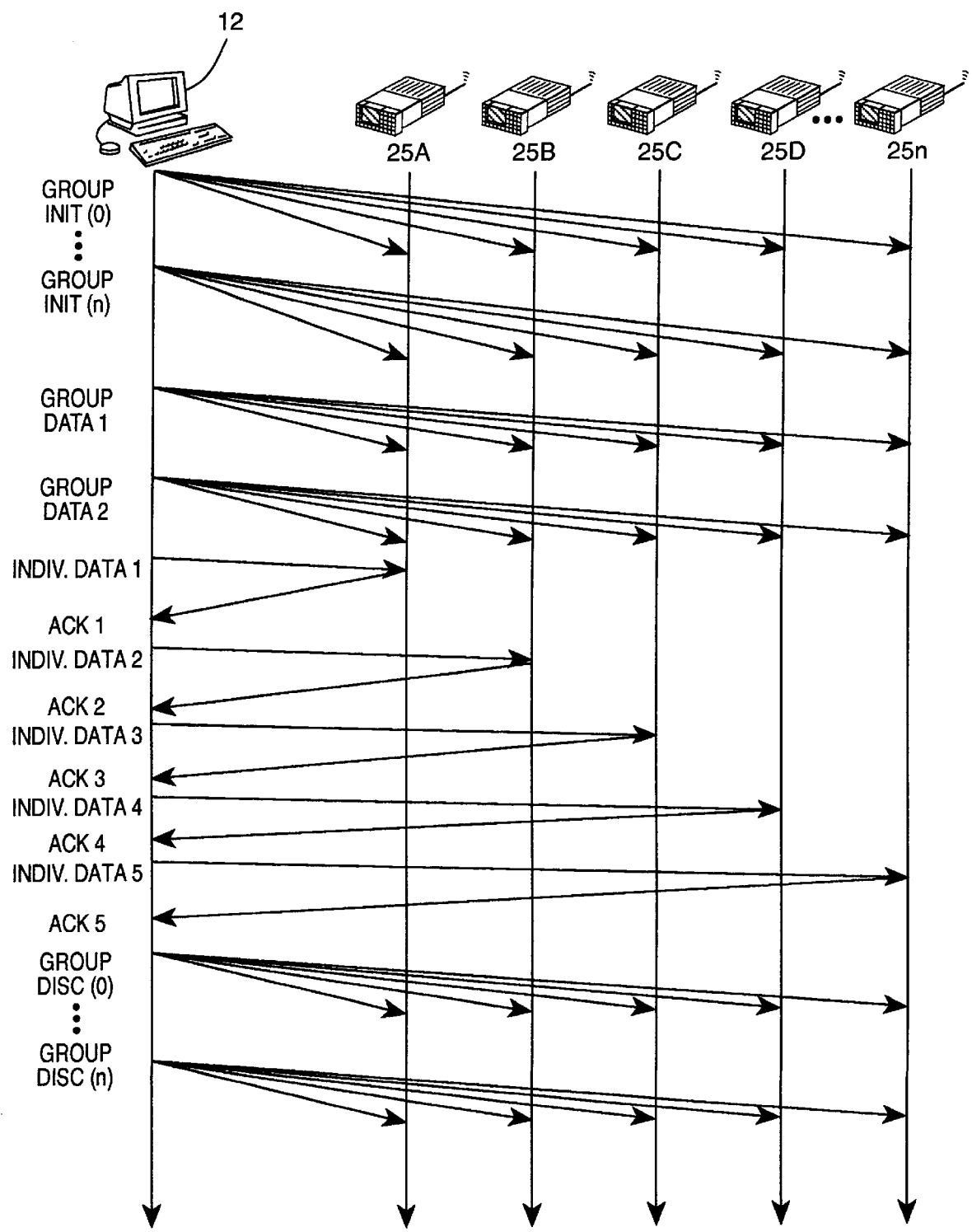
FIG. 3 is a time sequence of the present transfer layer broadcast.

An example protocol according to the present invention is shown in FIG. 3. In FIG. 3, the various transmissions to and from the communication manager 12 and radios 25a–25n are illustrated by arrowed lines. The vertical lines in FIG. 3 represent the state of the various components shown at the top of FIG. 3 over a course of time. The beginning of the broadcast session between the communication manager 12 and the radios 25a–25n begins at the top of FIG. 3 and continues over time to the bottom of FIG. 3. The generally horizontal lines in FIG. 3 represent communication transmissions to or from the communication manager 12 and the radios 25a–25n. In particular, when a communication occurs between the communication manager 12 and the mobile radios 25a–25n, an arrow was drawn from the state line below the communication manager 12 to the respective mobile radio(s) receiving the particular transmission.

The transmissions between the communication manager 12 and radios 25a–25n are in a standard format wireless packet data protocol. That is, the transmissions from or to the communication manager 12 and the radios 25a–25n is by a wireless data packet stream with a packet data transport layer providing broadcast support. The transport layer of the present invention uses one of five different transfer units: an initial broadcast transfer unit, a data transfer unit, an acknowledge request data transfer unit, an acknowledge transfer unit, and a disconnect broadcast unit. In addition, an optional reset transfer unit can also be employed in the transport layer.

The initial broadcast transfer unit is used by the communication manager to initiate a broadcast communication session simultaneously with multiple mobile radios. The initial broadcast transfer unit is identifiable by the mobile radios as one requesting the start of a broadcast session and includes a command to the mobile radios informing them that receipt of the initial broadcast transfer unit should not be acknowledged individually by the mobile radios.

The data transfer unit is used by the communication manager 12 to send, for example, new radio personality information simultaneously to multiple mobile radios 25a–25n. Typically, a personality information file will comprise multiple packets of data (up to 14K bytes) and thus multiple data transfer units will be broadcast from the communication manager 12 to the multiple mobile radios 25a–25n in the form of these data transfer units. Like the initial broadcast transfer unit, the data transfer unit includes a command indicating that the mobile radios should not acknowledge receipt of the data transfer unit individually to the communication manager 12.

The acknowledge request data transfer unit is used by the communication manager 12 to continue the transfer of data to the multiple mobile radios 25a–25n. It is identical to the data transfer unit, except that it indicates to the mobile radios 25a–25n that an acknowledgment is requested from each of the individual mobile radios 25a–25n. That is, upon receipt of the acknowledge request data transfer unit by the mobile radios 25a–25n, the mobile radios 25a–25n will individually provide an acknowledgment of the data transfer.

In the preferred embodiment, the acknowledge request data transfer unit is used only as the last transfer unit in a sequence of transfer units sending the new personality information to the multiple mobile radios 25a–25n. That is, if a personality information file contains 20 data packets, 19 data packets will be data transfer units and the 20th data packet will be an acknowledge request data transfer unit. Alternatively, the acknowledge request data transfer unit can be used periodically (or sporadically) within a sequence of data packets. Thus, for example, the acknowledge request data transfer unit can be sent every nth packet to insure that the previous "n" packets were received.

In response to the acknowledge request data transfer unit, each individual mobile radio 25a–25n sends an acknowledge transfer unit to the communication manager 12. The content of this acknowledgment is discussed in detail below.

Finally, the disconnect broadcast unit is used by the communication manager 12 to communicate the end of a broadcast session with the multiple mobile radios. The disconnect broadcast unit is sent simultaneously to the multiple mobile radios 25a–25n.

FIG. 3 illustrates the communication of these various transfer units to and from the communication manager 12 and the mobile radios 25a–25n. As shown at the top of FIG. 3, the broadcast session begins with the transmission of an initial broadcast transfer unit ("Group INIT(o)") from the communication manager 12 simultaneously to each of the mobile radios 25a–25n. Following the first initial broadcast transfer unit transmission from the communication manager, the communication manager 12 repeats the identical initial broadcast transfer unit a plurality of times ("Group INIT(n)"). The number of initial broadcast transfer units transmitted by the communication manager 12 to begin each broadcast session can be any number depending on the circumstances of the broadcast environment. The invention works well with five initial broadcast transfer units being transmitted by the communication manager 12 to begin each broadcast session. The multiple initial broadcast transfer units are transmitted to ensure that the multiple mobile radios 25a–25n each receive the initial broadcast transfer unit and thus each recognize that the communication manager 12 is initiating a broadcast communication session with the multiple mobile radios. The repetitious sending of the initial broadcast transfer unit is designed to avoid each of the multiple mobile radios 25a–25n sending acknowledgments of the broadcast initiation command to the communication manager 12. For example, if 100 multiple mobile radios are being reprogrammed, the 200 different packet slots required to send initiation commands and acknowledgment responses to and from the 100 mobile radios 25a–25n and the communication manager 12 are replaced by only 5 initial broadcast transfer units from the communication manager 12 to the radios 25a–25n. This results in at least 195 packet savings compared to prior devices.

After the initial broadcast transfer unit is communicated a plurality of times to the mobile radios, the communication manager 12 can be assured that the mobile radios 25a–25n recognize that a broadcast session has begun. The communication manager 12 can then send the data transfer units ("Group DATA 1," "Group DATA 2," etc.) simultaneously to the mobile radios 25a–25n. Although FIG. 3 shows only two data transfer units being broadcast to the mobile radios 25a–25n, the communication manager 12 would send as many data transfer units as necessary to complete the transmission of all packets of a data file, for example, the new personality information data file. The last packet in the sequence of data packets used to transmit the data file is the acknowledge request data transfer unit (shown in FIG. 3 as "Indiv.DATA 1"). The acknowledge request data transfer unit is communicated from the communication manager 12 to the mobile radios with a command indicating to the mobile radios that an acknowledgment is requested from the mobile radios to the communication manager. As described later, using the particular communication protocol and transfer units of the present invention, the entire sequence of data packets can be transmitted simultaneously to the mobile radios with assurance that each mobile radio received each of the data packets, even though only the last data packet requests an acknowledgment from the mobile radios. This permits the communication manager 12 to communicate simultaneously to the mobile radios for all of the data packets without using packet transmission time to receive acknowledgments for each data packet from each of the mobile radios.

In response to the acknowledge request data transfer unit "Indiv.DATA 1"–"Indiv.DATA n", sending the last data packet in the sequence of data packets to the mobile radios, each individual mobile radio returns an acknowledged transfer unit ("ACK1"–"ACKn") to the communication manager 12. As described later, the content of this acknowledge transfer unit from each mobile radio to the communication manager 12 can be processed by the communication manager 12 to allow the communication manager to determine whether each mobile radio 25a–25n properly received the sequence of data packets.

The process of sending acknowledge request data transfer units and receiving acknowledgments to and from the mobile radios 25a–25n continues until each mobile radio has received the last in the sequence of data packets and has acknowledged it. At that time, the communication manager 12 broadcasts a plurality of disconnect broadcast units ("Group DISC(o)–(n)). Again, like the initial broadcast transfer unit, the number of disconnect broadcast units can be any number depending on the communication environment. The disconnect broadcast unit is transmitted a plurality of times to ensure that the multiple mobile radios 25a–25n each receive the disconnect instruction, without having to acknowledge receipt of such. Transmitting the disconnect broadcast unit 5 times works well with the present invention.

Having received the packets of data in the form of the data transfer units and the single acknowledge request data transfer unit from the communication manager 12, the multiple mobile radios 25a–25n then put together the data file from the packets in known fashion. If the data file is new personality information 34 (FIG. 2), the multiple mobile radios 25a then use the new personality information 34 combined with the unique logical identification code 32.

Figure 4:
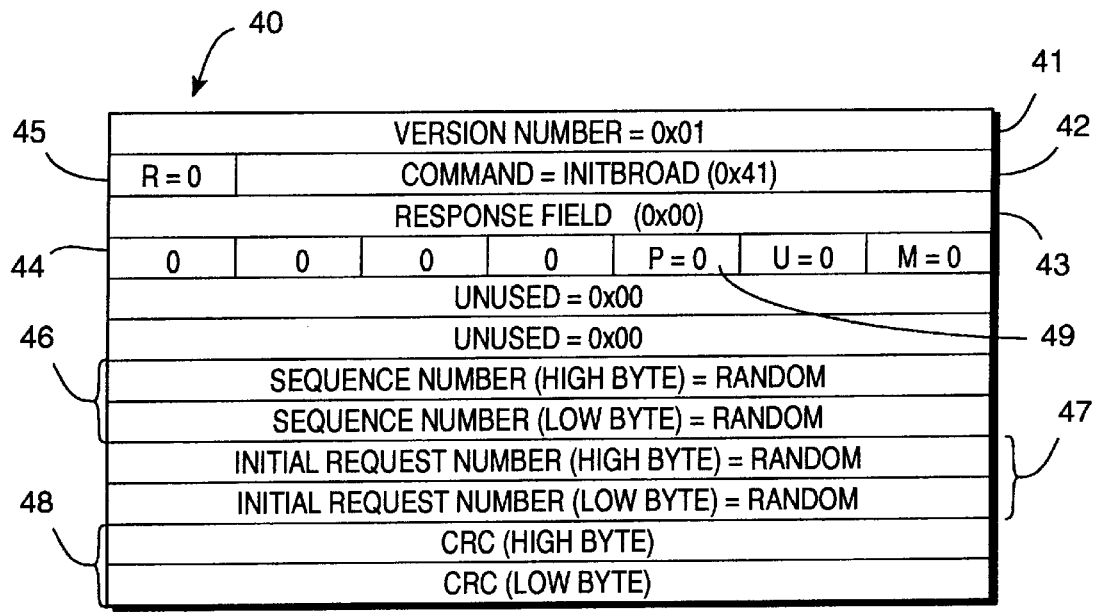
FIG. 4 is an initial broadcast transfer unit.
Figure 5:
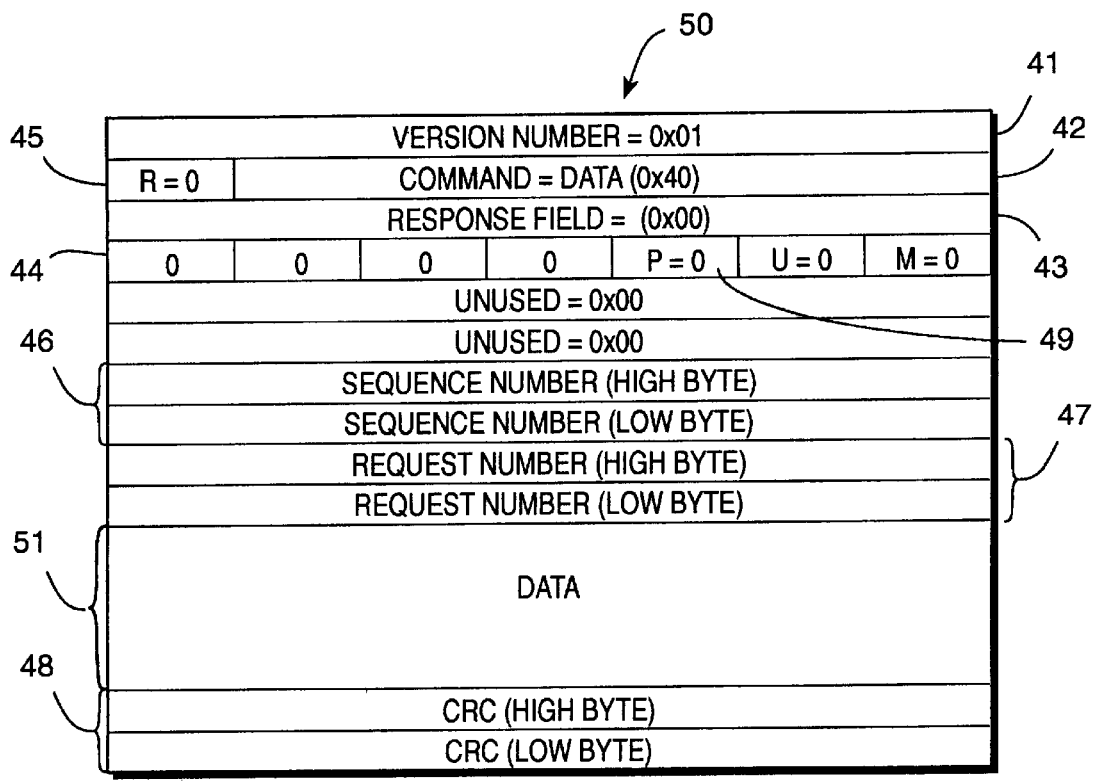
FIG. 5 is a data broadcast transfer unit.
Figure 6:
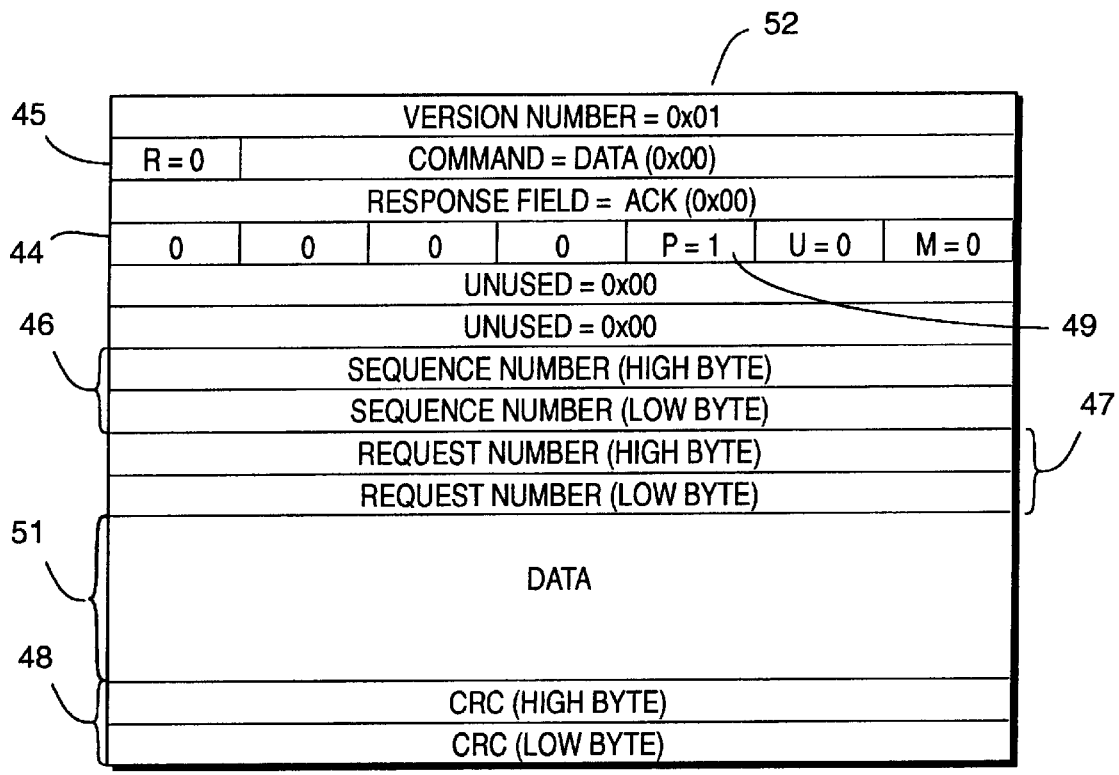
FIG. 6 is an acknowledge request data transfer unit.
Figure 7:
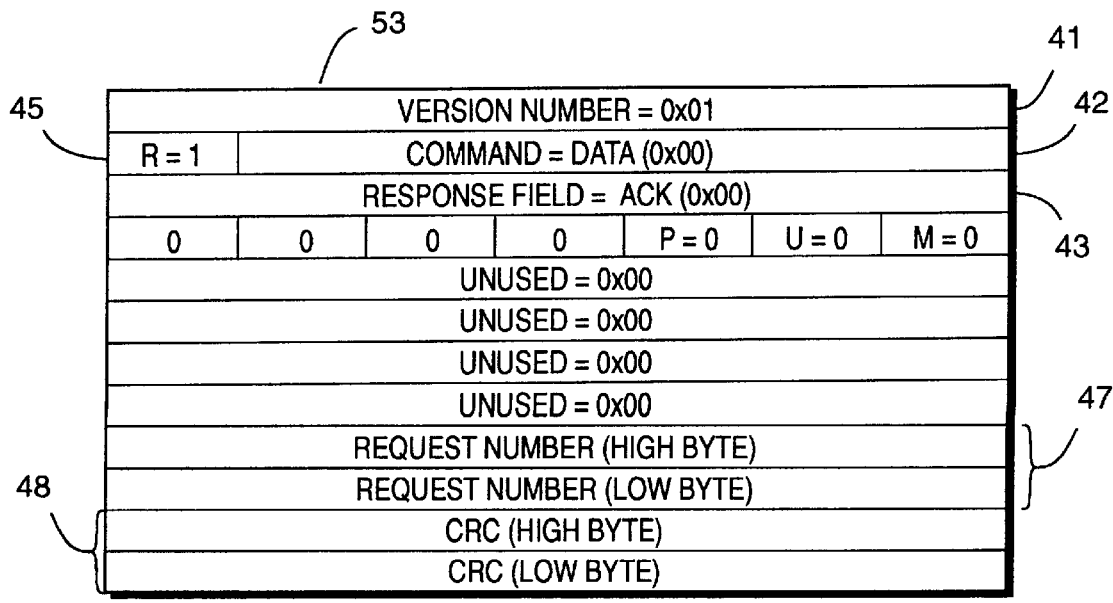
FIG. 7 is an acknowledge transfer unit.
Figure 8:
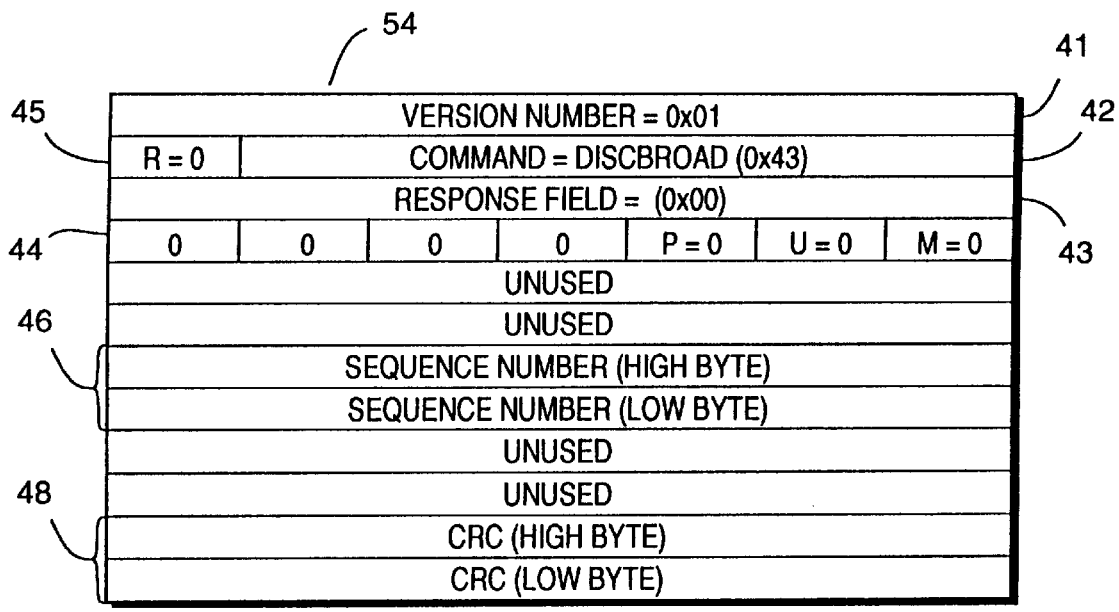
FIG. 8 is a disconnect broadcast unit.
Figure 9:
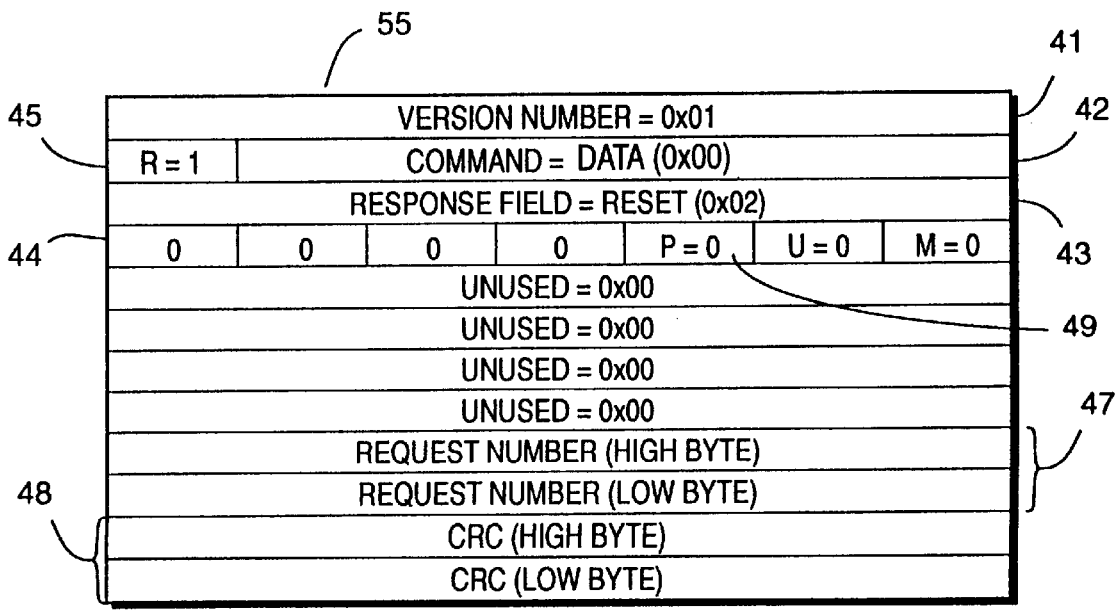
FIG. 9 is a reset transfer unit.

The various transfer units in the packet data transfer protocol layer are shown in FIGS. 4–9. The transfer unit is made up of a number of fields, some of which are common to each of the various types of transfer units shown in FIGS. 4–9. FIG. 4 shows the fields in the initial broadcast transfer unit 40, FIG. 5 shows the fields in the data transfer unit 50, FIG. 6 shows the fields in the acknowledge request data transfer unit 52, FIG. 7 shows the fields in the acknowledge transfer unit 53, FIG. 8 shows the fields in the disconnect broadcast unit, and FIG. 9 shows the fields in the reset unit 55. Although other types of transport protocol data units (TPDU) can be realized in the present invention, those shown in FIGS. 4–9 make up the transport protocol data units in the presently preferred embodiment.

Each of the TPDU structures includes a version number field 41 which includes a code identifying the type of protocol being used for the TPDU structure. Each of the TPDUs also includes a "command" field 42 which identifies the particular type of TPDU being sent. In the case of FIG. 4, for example, the command field 42 includes the "init-broad" command code ("0×41") identifying the TPDU as an initial broadcast transfer unit. Similarly, FIG. 5 includes the command field 42 code "0×40" identifying it as a data transfer unit, FIG. 6 includes the command code "0×00" identifying it as an acknowledge request data transfer unit, FIG. 7 includes the command code "0×00" which is a default code for a response rather than a command (FIG. 7 is a response TPDU rather than a command TPDU), FIG. 8 includes the command code "0×43" identifying it as a disconnect broadcast unit, and FIG. 9 includes the default command code "0×00."

Each TPDU also includes a "R flag" 45 indicating whether a particular TPDU is a command to the mobile radios or a response from the mobile radios. When the "R flag" 45 is set to 0, the TPDU is identified as a command to the mobile radios and when it is set to 1, the TPDU is identified as a response. Accordingly, all of the TPDUs except FIG. 7 and FIG. 9 are commands from the communication manager 12 to the multiple mobile radios. FIGS. 7 and 9, identifying the acknowledge transfer unit and reset unit, have the "R flag" set to 1 to identify them as responses from the mobile radios to the communication manager 12.

Each TPDU also includes a response field 43 identifying the type of response provided by the mobile radios to the communication manager 12. In FIGS. 4–6 and 8, the response field is defaulted to 0×00 since these TPDUs are commands, not responses. For FIG. 7, the response field is also 0×00 which is the identifier for an acknowledge transfer unit sent from the mobile radios to the communication manager 12. Note that the default response 0×00 of FIGS. 4–6 is distinguishable from the response field 0×00 of FIG. 7 since the R flag 45 is set to 1 rather than 0, thus, focusing attention on the response field rather than the command field. For FIG. 9, the response field is set to 0×02 identifying this TPDU as a reset response.

Each of the TPDUs also includes a number of control bits 44, some of which are unused (and are thus filled with zeros). One control bit of particular importance is the poll bit 49. The poll bit 49 is the command flag to the mobile radios 25a–25n indicating to them that an acknowledgment is requested to the TPDU. As shown by a comparison of FIGS. 4–9, the only TPDU with the poll bit set high (thus indicating that an acknowledgment is desired) is the acknowledge request data transfer unit 52 of FIG. 6. Since the present application permits data transfer with a high confidence that the transfer is completed successfully, without requiring multiple acknowledgments from the mobile radios, the poll bit 49 is advantageously set to zero as often as possible, thus indicating that acknowledgments are not permitted to the particular TPDU.

Some of the TPDUs include sequence number fields 46 and request number fields 47. The sequence number fields identify the sequence numbers of data packets being broadcast from the communication manager 12 to the multiple mobile radios 25a–25n. The TPDUs also include a request number field 47 identifying the sequence number of the next expected sequence number. Thus, the sequence number field 46 includes the sequence number of the current data packet being transmitted by the communication manager and the request number indicates the next expected sequence number by the radio. In addition, the TPDUs include a CRC (cyclic redundancy check) field 48 which is a well-known forward error detection technique.

In FIG. 4, the initial broadcast transfer unit is depicted. Since the initial broadcast transfer unit is a command from the communication manager 12 to the mobile radios, the R flag 45 is set to 0 and the command field 42 is set to 0x41 indicating an initial broadcast transfer unit. The response field 43 is irrelevant since this TPDU is not a response and is therefore set at 0x00. The poll bit 49 is set to zero indicating that no acknowledgment is desired to this initial broadcast transfer unit. This lack of acknowledgment is made permissible by the present invention, as described and shown with respect to FIG. 3 above, as a result of the repetitious transmission of the initial broadcast transfer unit shown in FIG. 4. The initial broadcast transfer unit also includes a sequence number in the sequence number field 46 which identifies the first sequence number in the sequence of data packets to be transmitted when the broadcast communication session begins. This sequence number is specified by the communication manager 12 and can be any random number. The request number field 47 includes a request number also provided by the communication manager 12 and indicates to the radios which initial sequence to follow when they send radio originated TPDUs.

FIG. 5 illustrates the data transfer unit 50. Since the data transfer unit is a command without request for acknowledgment, the R flag 45 is set to 0, the command field 42 is set to 0x40, and the poll bit 49 is set to 0. The sequence number field 46 includes the sequence number for the data packet sent in the data transfer unit 50. For each new packet in the sequence, the sequence number will increment by a predetermined amount (usually by 1). The sequence number specified is from the communication manager sequence originating from the initial broadcast transfer unit 40. The request number field 46 in the data transfer unit 50 corresponds to the next expected radio originated sequence number. Importantly, the data transfer unit 50 is not radio specific, meaning that the information contained in the unit 50 is not unique to any of the particular radios 25a–25n. Rather, the information, including the data in the data field 51, is broadcast simultaneously to all of the mobile radios 25a–25n and is used by each of the radios in common fashion. As a result, the data transfer using the data transfer unit 50 can be sent to each of the multiple mobile radios without expending the packet slots that would otherwise be necessary to communicate individually with the mobile radios.

The acknowledge request data transfer unit 52 of FIG. 6 is identical to the data transfer unit 50 of FIG. 5, except that the poll bit 49 is set to 1 indicating that an acknowledgment is requested for the acknowledge request data transfer unit 52.

In response to the acknowledge request data transfer unit 52 of FIG. 6, the mobile radios 25a–25n send the acknowledge transfer unit 53 shown in FIG. 7. The acknowledge transfer unit 53 has the R flag 45 set to 1 indicating that the unit 53 is a response, not a command. In addition, the command field 42 is irrelevant and the response field 43 is set to 0x00 indicating that the TPDU is an acknowledge transfer unit.

In accordance with the protocol set by the present invention, the mobile radios 25a–25n respond with a request number in the request number field 47 indicating the number of the next packet expected by the mobile radio 25a–25n. The mobile radio can determine the request number by following the sequence numbers provided by the data transfer unit 50 (field 46) and the acknowledge request data transfer unit 52 (field 46). Since each data transfer unit 50 and acknowledge request data transfer unit 52 includes a sequence number incremented for the data packets being transmitted, the mobile radio can anticipate the next expected sequence number in the sequence when it receives the acknowledge request data transfer unit 52 and can report that as the request number 47 in the acknowledge transfer unit 53. If the sequence has gotten out of order for whatever reason (lost packets, repeated packets, packets received with bad CRC check sums, etc.), then the communication manager 12 will recognize this via the request number provided by a particular mobile radio in the acknowledge transfer unit 53. Upon receiving the request number in the acknowledge packet, the communication manager 12 can determine that the mobile radio returning the acknowledge transfer unit 53 having sent the incorrect request number 47 did not properly receive the entire sequence of packets and can initiate some action to retransmit that sequence to the mobile radio.

If the communication manager 12 recognizes that a predetermined percentage of mobile radios returned incorrect request numbers in the request number fields 47 of their respective acknowledge transfer unit 53, the communication manager can begin the entire broadcast communication session (all of FIG. 3) again. On the other hand, if only a small percentage of mobile radios returned incorrect request numbers in their respective acknowledge transfer units 53, the communication manager 12 can initiate retransmission of the data packets on a one-to-one basis. The determination whether to retransmit on a broadcast level versus a one-to-one level can be determined based on an analysis of the approximate total packet requirements for each of the two options.

In the example where the sequence numbers are incremented by one for each data packet, if no error condition occurs in the transmission of packets to a respective mobile radio during the broadcast session, then the request number will equal the last sequence number plus 1, i.e., the next packet expected in the sequence. The request number thus corresponds to the next expected communication manager originated TPDU sequence number.

Finally, FIG. 9 shows the final type of TPDU, the reset unit 55. The reset TPDU is issued in response to a data command when there is no session established between the communication manager and the radio. That is, if a radio 25a–25n receives a data command from the communication manager 12, yet has not established a broadcast session between the communication manager 12 and the radio, the radio issues the reset unit 55 to the communication manager 12 indicating that an error has occurred. In the reset TPDU, the R flag 45 is set to 1 indicating a communication from the radios to the communication manager. This makes the command field 42 irrelevant. The response field 43 is set to 0×02 identifying the TPDU as a reset unit. The poll bit 49 is set to 0 indicating that no acknowledgment is required for the TPDU. Finally, the request corresponds to the next communication manager originated TPDU sequence number that would be expected if the current session was not being reset.

When a broadcast session is completed between the communication manager and the multiple radios 25a–25n, the TPDU of FIG. 8 is transmitted multiple times from the communication manager 12 to the radios. The TPDU of FIG. 8 is the disconnect broadcast unit 54. The R flag 45 is set to 0 indicating a command, making the response field 43 irrelevant. The command field 42 identifies the TPDU as the disconnect broadcast unit issued by the communication manager in order to close a broadcast session with the radios. The sequence number 46 corresponds to the current communication manager originated sequence number. The disconnect broadcast unit 54 is transmitted multiple times to ensure that all of the intended radios learn that the broadcast session has been terminated.

Figures 10, 11:
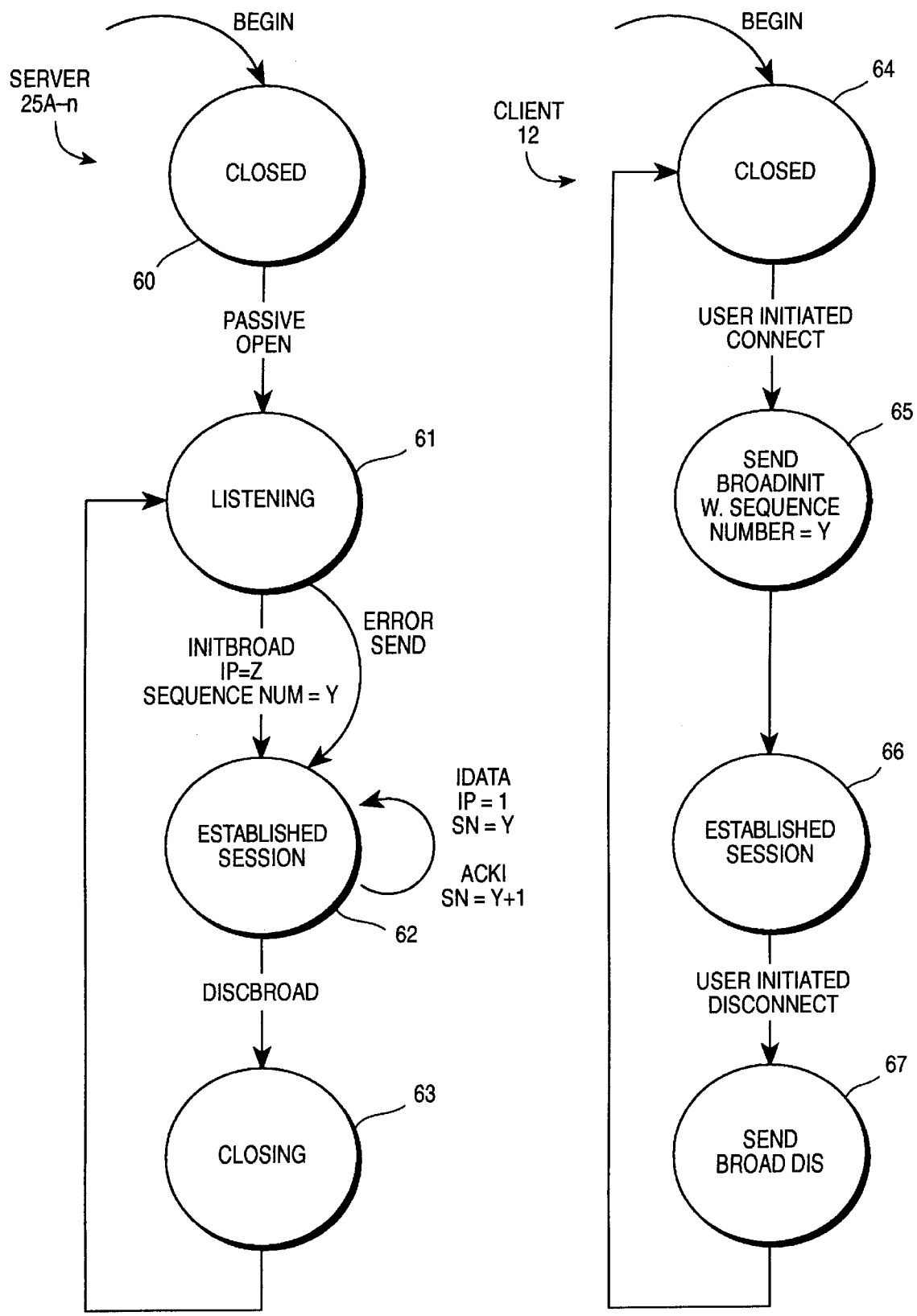
FIG. 10 is a state diagram of the radio states.
FIG. 11 is a state diagram of the communication manager states.

FIG. 10 illustrates the state diagram for the radios 25a–25n (aka "servers"). At the top of FIG. 10, the radios begin in a closed broadcast state 60. The radios then move into a listening mode 61 where they await an initial broadcast transfer unit transmitted by the communication manager 12, in state 61. When the initial broadcast transfer unit ("INITBROAD") is sent, a broadcast session is established in state 62. Note that the initial broadcast transfer unit issues a sequence number of "y" originated from the communication manager 12. During the established session state 62, data is transmitted via the data transfer units 50 until the acknowledge request data transfer unit 52 is sent on the last data packet ("IDATA"). If only one data packet is being transmitted, the data packet will take the form of the acknowledge request data transfer unit 52 with a serial number equal to y. An acknowledge transfer unit 53 ("ACK1") will then be transmitted from the radios to the communication manager 12 with a request number equal to y+1. Of course, if more than one data packet is transmitted, the packets will be transmitted by data transfer units 50 until the final packet is transmitted by the acknowledge request data transfer unit 52. In this instance, the acknowledge request data transfer unit 52 will have a sequence number equal to y+n where n is the number of data transfer units 50 transmitted. Then, the acknowledge transfer unit 53 sent from the radio to the communication manager 12 in response to the acknowledge request data transfer unit 52 will respond with a request number equal to y+n+1.

After the data transmission session is completed, the disconnect broadcast unit 54 is sent multiple times, putting the radios into the closing state 63, where they wait until they begin the listening state 61 when the next initial broadcast transfer unit is again received.

FIG. 11 shows the state diagram for the communication manager 12 (aka "client"). The communication manager 12 begins in the closed state 64 until a user initiates a broadcast sequence. Then, the communication manager 12 enters the initial broadcast state 65 in which the manager sends the initial broadcast transfer unit with a sequence number equal to y. The data transmission session is then established in state 66, as described in detail with respect to FIG. 10 above, until the transmission session is completed and the disconnect broadcast unit 54 is sent to place the manager 12 in the send broadcast disconnect state 67. Then, the manager returns to the closed state 64 until the user initiates another transmission session.

Figure 12:
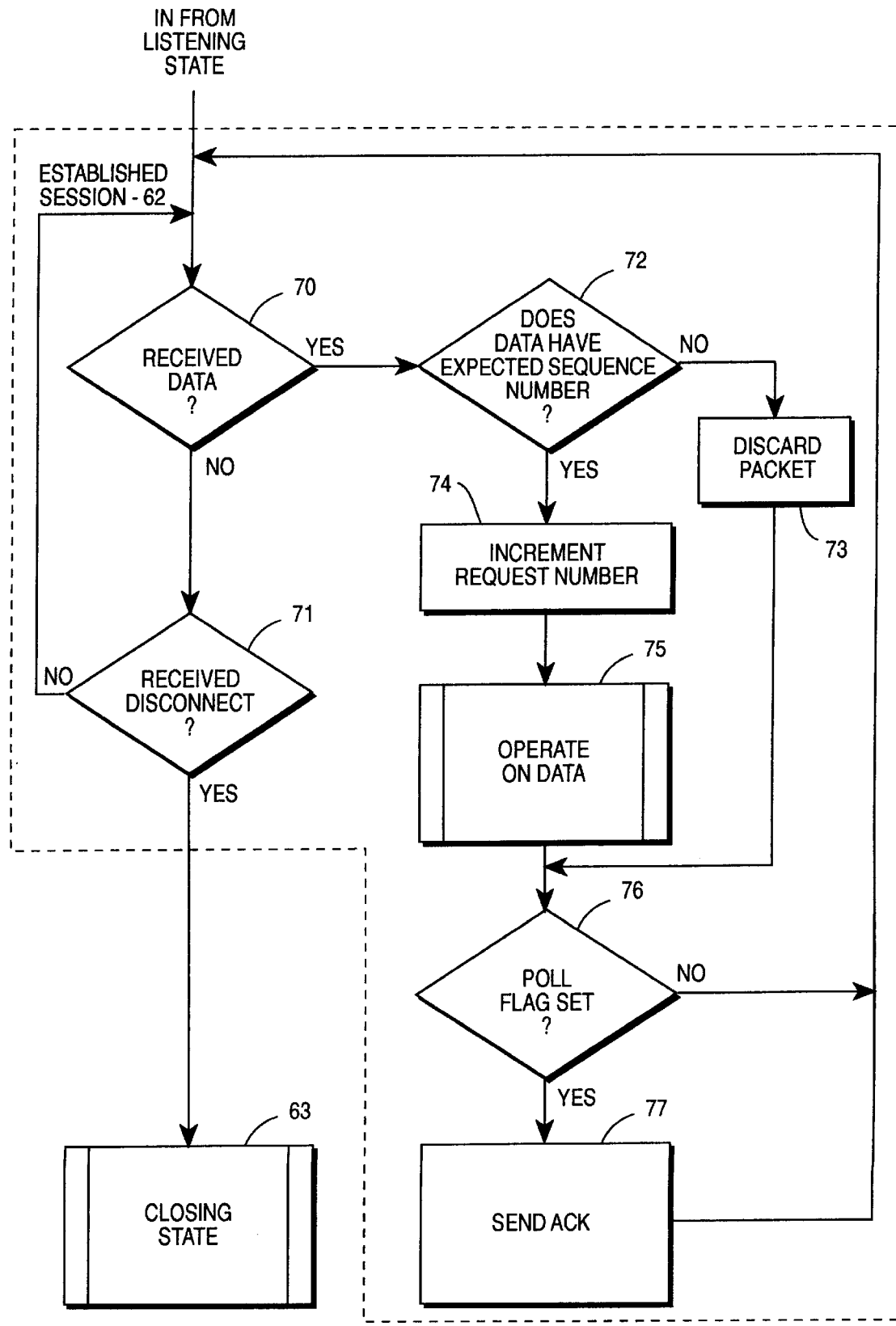
FIG. 12 is a flowchart illustrating an established session state.

FIG. 12 is a flowchart illustrating the established session state 62 of FIG. 10. After the initial broadcast transfer unit 40 is received the plurality of times, the established session 62 begins. In the first step, the radio ascertains whether data is received in step 70. If not, the radio determines whether the disconnect broadcast unit 54 has been received in step 71. If so, the radio goes to the closing state 63 (FIG. 10). If the disconnect broadcast unit 54 has not been received, the mobile radio again awaits receipt; of data at step 70.

When data is received by the mobile radio via the data transfer unit 50 or acknowledge request data transfer unit 52, the received data step 70 is affirmative and the sequence proceeds to step 72 where the radio determines whether the data has the expected sequence number. If not, the packet is discarded in 73. If the data has the expected sequence number, the mobile radio increments its internal request number 74 by the predetermined number (usually 1). At step 75, the mobile radio operates on the data by loading it into memory, etc. At step 76, the mobile radio determines whether the pole flag 49 has been set for the unit just received. This determines whether the data unit received was a data transfer unit 50 versus an acknowledge request data transfer unit 52. If the poll flag is not set, the transfer unit is a data transfer unit 50 and the mobile radio returns to step 70 to await the next data unit being broadcast by the communication manager 12. If, on the other hand, the poll flag is set in step 76, the mobile radio recognizes the data unit as an acknowledge request data transfer unit 52 and sends an acknowledge transfer unit 53 in step 77.

Figure 13:
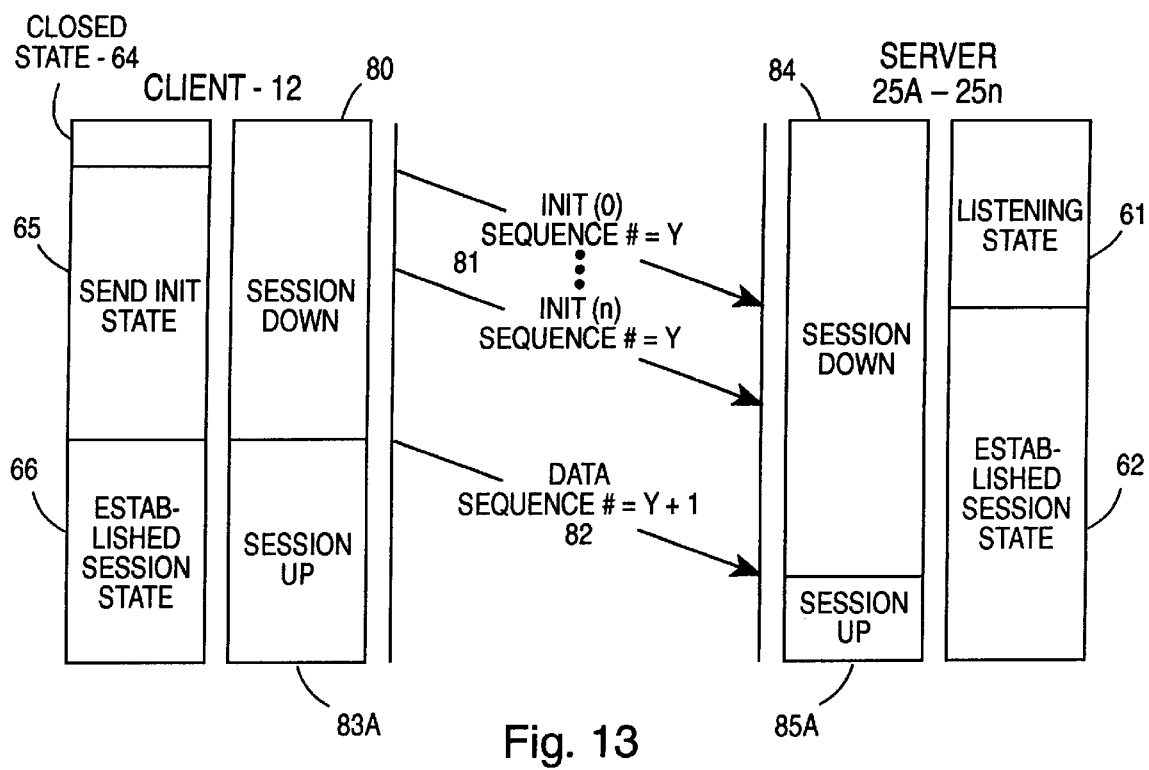
FIG. 13 is a timing diagram of the broadcast initialization sequence.
Figure 14:
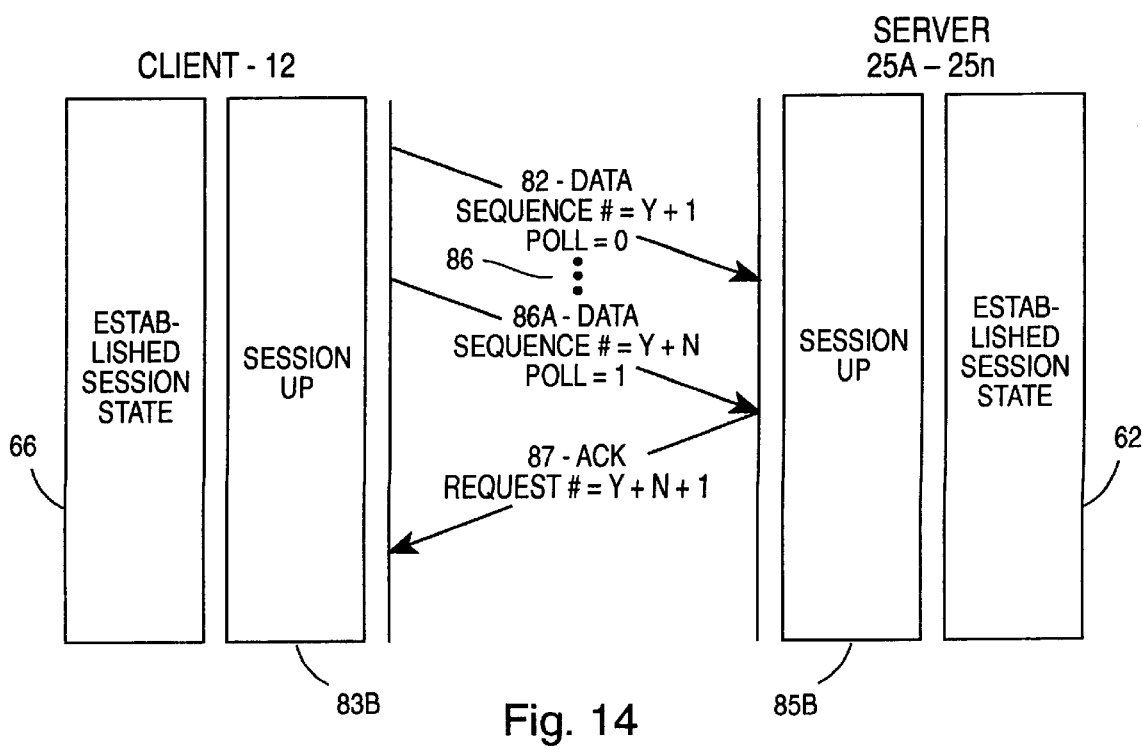
FIG. 14 is a timing diagram of the server states during a data transfer.
Figure 15:
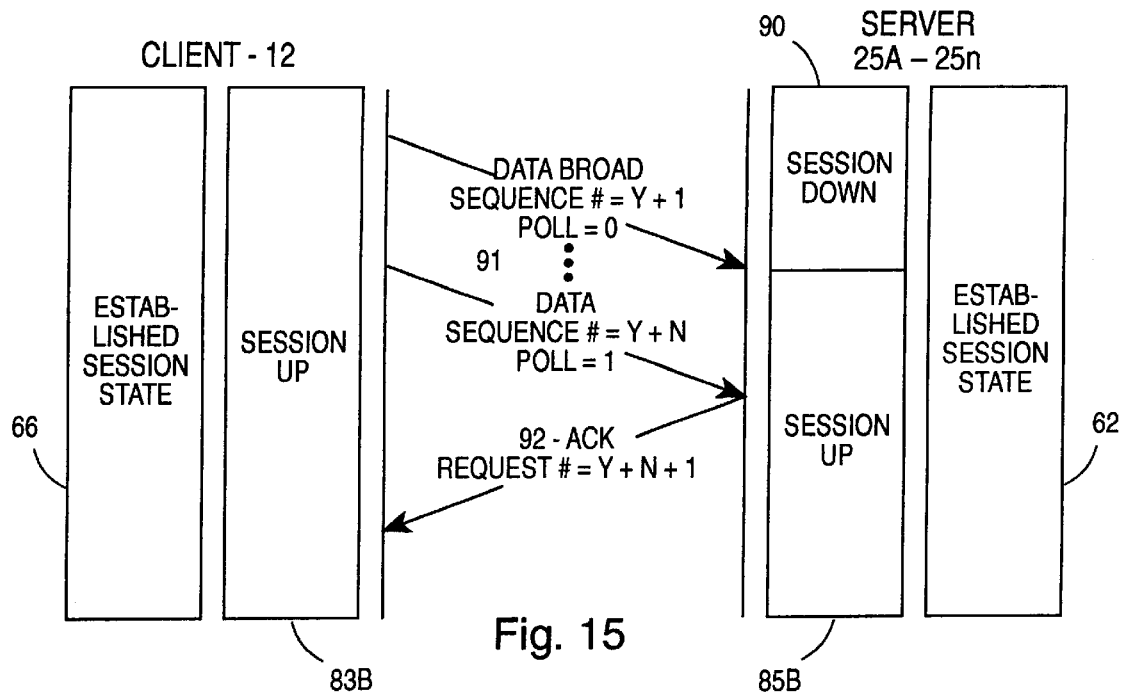
FIG. 15 is a timing diagram of the client states during a data transfer.

In FIGS. 13–17 the various communication manager ("client") and radio ("server") states are shown for the various broadcast events. FIGS. 13–17 can be viewed as a chronological sequence from top to bottom of each Figure, except that FIGS. 14 and 15 are alternative embodiments. Thus, the bottom of FIG. 13 can be matched to the top of FIG. 14 or FIG. 15. FIG. 14 and FIG. 15, being alternative embodiments, match to FIG. 16, which in turn matches onto FIG. 17 to form a continuous time line of session states. The left column below the "client" title indicates the states for the communication manager. The right column indicate where the communication manager is in or out of session. Similarly, the two columns below the "servers" title indicate the states for radios 25a–25n (right column) and the session status (left column).

In FIG. 13, the server 12 sends the initial broadcast transfer units 40 ("INIT(0)") a number of times with the sequence number equal to y at step 81. At this time, the communication manager 12 transitions from the closed state 64 into the send initial broadcast state 65 while the radios 25a–25n transition from the listening state 61 to the established session state 62. Note that the radios 25a–25n will transition from the listening state 61 to the established session state 62 when they first recognize the initial broadcast transfer unit 40; that is, the radios do not have to wait for the completion of the plurality of repetitious broadcasting of the initial broadcast transfer units 40 before the state transitions from the listening state 61 to the established session state 62. For the communication manager 12, the session is down in state 80 until the first data transfer unit 50 ("DATA") is transmitted to the radios 25a–25n. Similarly, the radios 25a–25n are in the session down state 84 until they receive the first data transfer unit 50 from the communication manager 12, at which time they transition to the session up state 85a. Note that the communication manager 12 transitions from the session down state 80 to the session up state 83a slightly ahead of the radios transitioning from the session down state 84 to the session up state 85a as a result of propagation delays with respect to the data transfer unit transmission 82.

In FIG. 14, the data transfer unit transmission 82 is shown again (from the bottom of FIG. 13). Here, both the communication manager 12 and the radios 25a–25n are in established session states 66 and 62, respectively, and are in session up states 83b and 85b, respectively. During these states, the plurality of data transfer units 50 are transmitted from the communication manager 12 to the radios 25a–25n until the complete sequence of data has been transmitted, less the last packet of data. The complete sequence of data transfer units 50 transmitted from the communication manager 12 to the radios 25a–25n are indicated by numeral 86 and are transmitted sequentially beginning with the initial data transfer unit transmission 82 having sequence number y+1. Thereafter, each data transfer unit 50 in the transmissions 86 will increment sequence numbers by 1 as they are transmitted sequentially to the radios. Finally, the last packet of data is transmitted to the radios via the acknowledge request data transfer unit 52 with the sequence number equal to y+n, where n is the number of data transfer units 50 previously transmitted to the radios. The transmission of this acknowledge request data transfer unit 52 is shown as 86a in FIG. 14, with the poll bit 49 (FIG. 6) placed at 1 to indicate to the radios that an acknowledgment is requested for this final data packet.

In response, the radios transmit an acknowledge transfer unit 53 in the transmission 87 shown in FIG. 14 with a request number equal to the next sequence number expected by the radios. If every data packet has been properly transmitted and received by the communication manager to the radios, the request number transmitted from the radios in transmission 87 will equal y+n+1; but, if an error has occurred, this request number will be equal to some number other than y+n+1.

Upon receipt of the acknowledge transfer unit 53 in the transmission 87 of FIG. 14, the communication manager 12 increments the previous sequence number in the transmission 86a by one and compares that calculation to the request number transmitted by the independent radios during transmission 87. Using this to determination, the communication manager 12 can determine whether each independent radio properly received the full sequence of data packets transmitted by the communication manager 12.

FIGS. 14 and 15 are alternative embodiments of an established session state. FIG. 14, as described earlier, relates to an established session state begun by a radio 25a–25n. On the other hand, FIG. 15 illustrates a similar established session state established by the communication manager 12. In FIG. 15, the transmissions 91 are generally identical to the transmissions 82/86/86a of FIG. 14 and the acknowledgment transmission 92 is generally the same as the acknowledgment transmission 87 of FIG. 14. What is different is in the client established session state of FIG. 15, the radios do not recognize the session upstate 85b until the first broadcast data is received in transmission 91, wherein the session state transitions from down session state 90 to up session state 85b.

Figure 16:
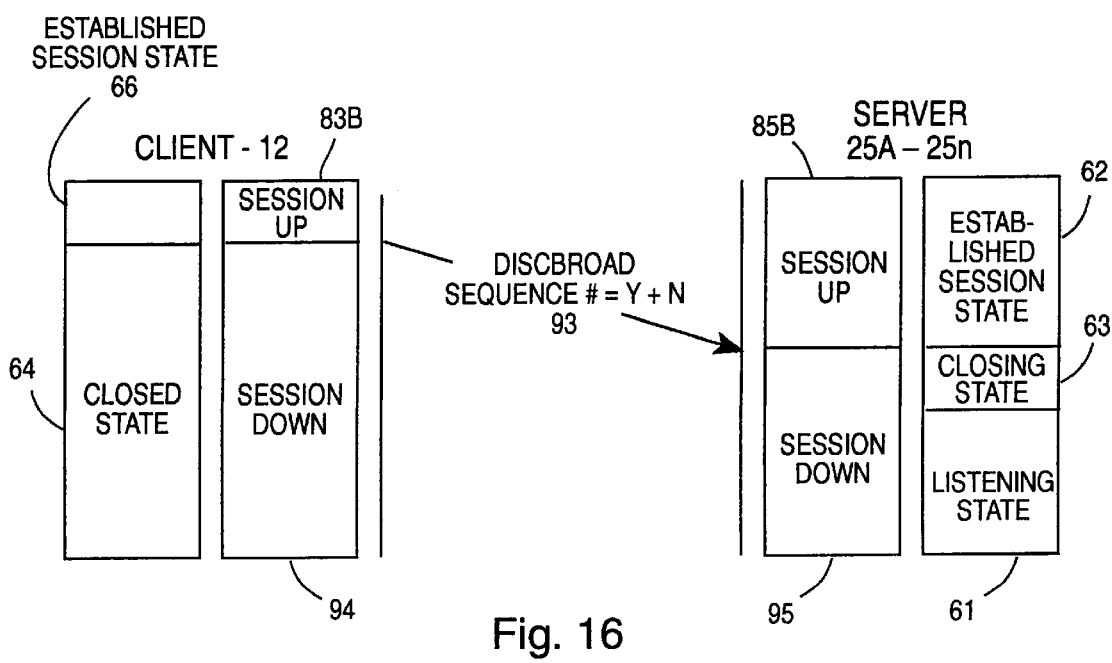
FIG. 16 is a timing diagram of the server states during a broadcast disconnect sequence.

In FIG. 16, the communication manager and radio states are illustrated during a transmission of a disconnect broadcast unit 34. The communication manager 12 begins in the established session state 66 from either FIG. 14 or FIG. 15 and in the session up state 83b from the same Figures. Upon issuance of the disconnect broadcast unit 54 via the DISCBROAD transmission 93, the communication manager 12 transitions from the established session state 66 to the closed state 64. Also, upon issuance of the DISCBROAD transmission 93, the communication manager 12. transitions from the session up state 83b to the session down state 94.

As for the radios 25a–25n, they remain in the session up state 85b until the DISCBROAD transmission 93 is received, whereupon they transition to the session down state 95. Until the transmission 93 arrives, the radios are in the established session states 62 of FIGS. 14 or 15. Upon receipt of the DISCBROAD transmission 93, the radios transition to the closing state 63 and then after a predetermined time to the listening state 61. In FIG. 13, only one DISCBROAD transmission 93 is shown because the radios 25a–25n will transition from the states described above immediately upon receipt of the first DISCBROAD transmission 93 received.

Figure 17:
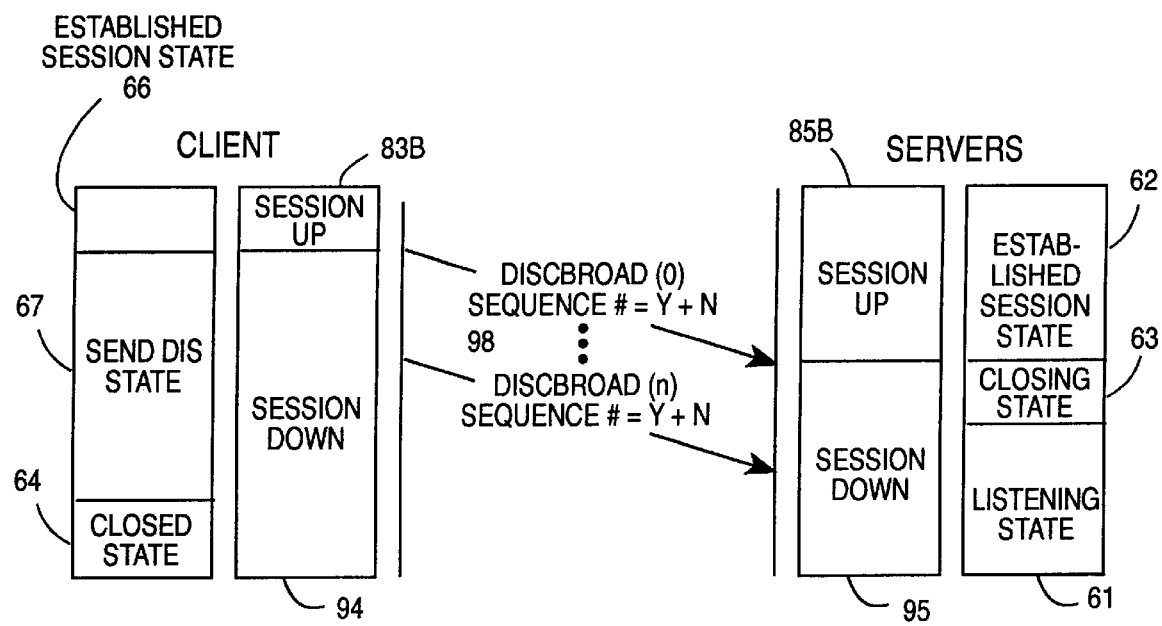
FIG. 17 is a timing sequence of the client states during a broadcast disconnect sequence.

By contrast, in FIG. 17, the client disconnect states are illustrated for the disconnect broadcast unit 54 transmissions. While the radios 25a–25n respond to the first received disconnect broadcast unit 54, and then go inactive for the remaining disconnect broadcast unit transmissions, the client state remains active until a plurality of disconnect broadcast units 54 have been transmitted in transmissions 98. Thus, FIG. 17 is identical to FIG. 16, except that the closed state of FIG. 16 is replaced by the send disconnect broadcast unit state 67 of FIG. 17, during which the plurality of disconnect broadcast units 54 are transmitted during transmissions 98.

Figure 18:
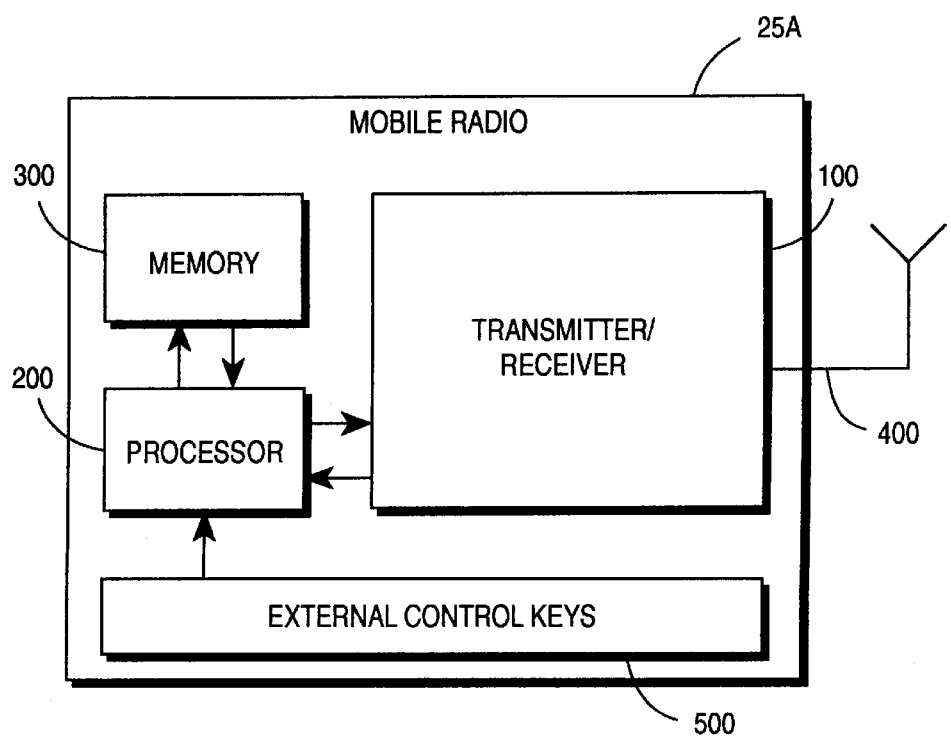
FIG. 18 is a schematic diagram of an example mobile radio.
Figure 19:
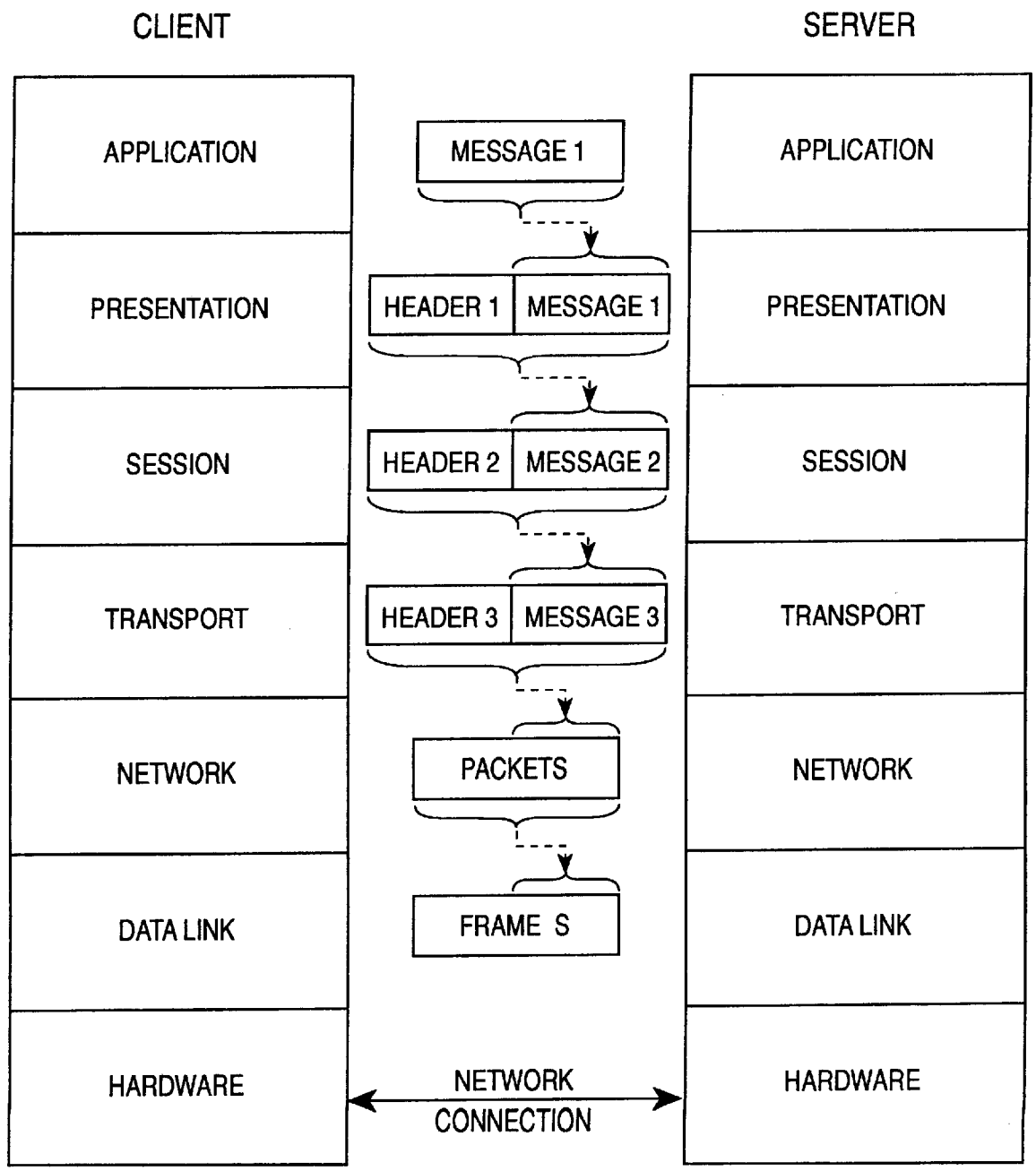
FIG. 19 is a schematic diagram of a prior art packet data network.

FIG. 18, illustrates a simplified version of mobile radio 25a. Each of the radios 25a–25n can have similar structures as those shown in FIG. 18 and described below. The mobile radio 25a includes a standard transmitter/receiver 100 which receives and sends packet data transmissions via a wireless broadcast network. The transmitter/receiver 100 can follow any of the many different transmitter/receiver structures that are well known in the art. The transmitter/receiver 100 communicates with a radio tower 20/22 via antenna 400.

The transmitter/receiver 100 communicates with the processor 200, which in turn communicates with the memory 300. The processor 200 is responsible for receiving the packet datas, such as a new personality information file from the transmitter/receiver 100. The processor 200 uses the packet datas to reconstruct the personality information file.

Personality information files are stored in the memory 300 for retrieval by the processor 200. The personality information files are stored in the format shown in FIG. 2 in which the personality information is stored together with a local identification code unique to the mobile radio 25a. When the communication manager 12 broadcasts new personality information 34 to the mobile radio 25a through the procedures described in detail above, the transmitter/receiver 100 receives the packet data containing the new personality information 34 and communicates those packets to the processor 200. The processor 20 reconstructs the personality information file 34 from the packets received from the transmitter/receiver 100. The processor 200 then retrieves the old personality information 30 from the memory 300, together with the local identification code 32. Then, the processor 200 reads the local identification code 32 and copies it into the new personality information 34. The new personality information 34 together with the original local identification code 32 is then stored into memory 300 for future use.

As is shown in FIG. 18, for example, external control keys 500 can be used with mobile radio 25a to permit a user to communicate with the processor 200 to enable various communications functions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A communication manager for sending data packets to a plurality of mobile radios, comprising a transceiver to 1) send at least one command to establish a broadcast session with the mobile radios, 2) broadcast some of said data packets simultaneously to the mobile radios without receiving acknowledgments individually from the mobile radios, 3) transmit others of said data packets individually to the mobile radios, 4) receive an acknowledgment to at least one of the individually transmitted data packets from said mobile radios of receipt of both the broadcasted and individually transmitted data packets, and 5) broadcast at least one command to disconnect the broadcast session with the mobile radios.

2. A communication manager according to claim 1, wherein said data packets broadcast simultaneously to the mobile radios include all data packets in a sequence of data packets except a data packet last in the sequence of data packets.

3. A communication manager according to claim 1, wherein said others of said data packets broadcast individually to the mobile radios include only the last data packet in a sequence of data packets.

4. A communication manager according to claim 1, wherein the transceiver establishes the broadcast session by broadcasting a broadcast initiation command repeatedly to the mobile radios.

5. A communications manager according to claim 4, wherein the transceiver broadcasts the initiation command without receiving any acknowledgments from the mobile radios.

6. A communication manager according to claim 1, wherein the transceiver disconnects the broadcast session by broadcasting a broadcast disconnect command repeatedly to the mobile radios.

7. A communication manager according to claim 6, wherein the transceiver broadcasts the disconnect command without receiving any acknowledgments from the mobile radios.

8. A communication manager according to claim 1, wherein the transceiver establishes the broadcast session by broadcasting a broadcast initiation command repeatedly to the mobile radios and disconnects the broadcast session by broadcasting a broadcast disconnect command repeatedly to the mobile radios.

9. A communications manager according to claim 8, wherein the transceiver broadcasts the initiation command without receiving any acknowledgments from the mobile radios and broadcasts the disconnect command without receiving any acknowledgments from the mobile radios.

10. A communications manager according to claim 1, wherein the data packets include personality information for the mobile radios.

11. A communication manager according to claim 10, wherein the data packets include complete personality information for each of the mobile radios with the exception of a logical identification code for said each of the mobile radios.

12. A communication manager according to claim 1, wherein said data packets broadcast simultaneously to the mobile radios include all data packets in a sequence of data packets except periodically occurring data packets in the sequence.

13. A communication manager according to claim 1, wherein said others of said data packets broadcast individually to the mobile radios include only periodically occurring data packets in a sequence of data packets.

14. A mobile radio used in a multi-point radio broadcast system of mobile radios and a central communications station, comprising:

a memory device containing alterable radio personality information including an identification code unique to said mobile radio among all of said mobile radios in the multi-point radio broadcast system;

a transceiver in broadcast communication with the central communications station using a packet data channel with a packet data transport protocol layer, said packet data transport protocol layer including:

an initial broadcast transfer unit transmitted by the central communications station to the mobile radios to initiate a broadcast communication session simultaneously with the mobile radios, said initial broadcast transfer unit including a command indicating the initiation of the broadcast communication session and a first command flag indicating that the mobile radios are not to acknowledge receipt of the initial broadcast transfer unit;

a data transfer unit used by the central communications station to send new radio personality information via a sequence of data simultaneously to the mobile radios, said data transfer unit including a sequence number identifying a current data packet in the sequence of data packets to be received by the mobile radios, said sequence of data including a second command flag indicating that the mobile radios are not to acknowledge receipt of the data transfer unit;

an acknowledge request data transfer unit used by the central communications station to continue a sequential transfer of data packets via said data transfer unit, including a poll flag indicating that the mobile radios are to acknowledge receipt to the central communications station of the current data packet in the sequence of data packets;

an acknowledge transfer unit used by the mobile radios to acknowledge receipt of a current data packet from the central communications station in response to the poll flag, including a request number identifying a data packet next expected in the sequence of data packets; and a disconnect broadcast unit used by the central communications station to end a broadcast communication with the mobile radios; and a processor to combine the new radio personality information with the unique identification code and write the new radio personality information with the unique identification code into the memory.

15. A mobile radio according to claim 14, wherein the acknowledge request data transfer unit occurs only during broadcast of a data packet in the sequence of data packets.

16. A mobile radio according to claim 14, wherein the packet data transport protocol layer further includes a reset unit broadcast from the mobile radio to the central communications station to restart a sending of new radio personality information via the sequence of data, wherein the reset unit broadcast includes a request number corresponding to the data packet next expected in the sequence of data packets had the reset unit broadcast not occurred.

17. A method of broadcasting radio personality information to multiple mobile radios, each of said multiple mobile radios having alterable radio personality information stored together with a unique radio identification code, comprising the steps of:

1) broadcasting a broadcast initiation command simultaneously to the multiple mobile radios without receiving an acknowledgment of receipt of the broadcast initiation command from the multiple mobile radios;
2) repeating step 1 a plurality of times;
3) broadcasting a current data packet associated with new radio personality information simultaneously to the multiple mobile radios without receiving an acknowledgment of receipt of the current data packet from the multiple mobile radios;
4) contemporaneously with step number 3, broadcasting a sequence number Y corresponding to the current data packet;
5) repeating steps 3) and 4) for a next data packet using a next sequence number equal to a previous sequence number incremented by a predetermined value;
6) repeating step 5) until all data packets are broadcast, except for a last data packet;
7) broadcasting the last data packet associated with the new radio personality information simultaneously to the multiple mobile radios;
8) contemporaneously with step 7), broadcasting a request for acknowledgment to said multiple mobile radios; and
9) receiving an acknowledgment from each of said multiple mobile radios including a request number equal to Y+n, where "n" is the sum of the increments actually received by each particular mobile radio in steps 5) through 8);
10) checking the request number received in step 9) for each mobile radio with the value of Y plus the sum of the increments broadcast in steps 5) though 8); and
11) rebroadcasting the data packets if in the check in step 10) one or more of said mobile radios did not return a request number equal to said Y plus the sum of the increments broadcast.

18. A method according to claim 17, wherein step 11 includes the steps of:

11A) determining a number of mobile radios satisfying the check in step 11),
11B) if the number of mobile radios determined in step 11A) is 100%, then ending;
11C) if the number of mobile radios determined in step 11A) exceeds a predetermined percentage but is less than 100%, then repeating steps 3)–10) for each individual mobile radio that did not return a correct request number in steps 9)–10);
11D) if the number of mobile radios determined in step 11A) does not exceed the predetermined percentage, then repeating steps 3)–11).

19. A communication manager for sending data packets to a plurality of mobile radios, comprising a transceiver to 1) send at least one command to establish a broadcast session with the mobile radios, 2) broadcast a continuous stream of said data packets simultaneously to the mobile radios without interrupting the stream for the purpose of receiving acknowledgments individually from the mobile radios, wherein said data packets broadcasted simultaneously to the mobile radios include all data packets in a sequence of data packets except at least one data packet last in the sequence of data packets 3) at the conclusion of said continuous stream broadcast, transmit the at least one data packet together with a request for acknowledgment individually to each of said plurality of mobile radios, and 4) receive an acknowledgment from said mobile radios that successfully received and understood the stream of data packets and 5) receive a re-transmission request from said mobile radios that did not successfully receive or understand the stream of data packets, and to re-transmit said stream of data packets individually to said mobile radios that return said re-transmission request.

20. A communication manager according to claim 19, wherein the data packets include personality information.

21. A communication manager according to claim 19, wherein said request for acknowledgment transmitted individually to the mobile radios includes a last data packet in a sequence of data packets.

22. A communication manager according to claim 19, wherein the transceiver establishes the broadcast session by broadcasting a broadcast initiation command repeatedly to the mobile radios.

23. A communication manager according to claim 22, wherein the transceiver broadcasts the initiation command without receiving any acknowledgments from the mobile radios.

24. A communication manager according to claim 19, wherein the transceiver disconnects the broadcast session by broadcasting a broadcast disconnect command repeatedly to the mobile radios.

25. A communication manager according to claim 24, wherein the transceiver broadcasts the disconnect command without receiving any acknowledgments from the mobile radios.

26. A communication manager according to claim 19, wherein the transceiver establishes the broadcast session by broadcasting a broadcast initiation command repeatedly to the mobile radios and disconnects the broadcast session by broadcasting a broadcast disconnect command repeatedly to the mobile radios.

27. A communication manager according to claim 26, wherein the transceiver broadcasts the initiation command without receiving any acknowledgments from the mobile radios and broadcasts the disconnect command without receiving any acknowledgments from the mobile radios.

28. A communication manager according to claim 20, wherein the personality information data packets include complete personality information for each of the mobile radios with the exception of a logical identification code unique to each of the mobile radios.

29. A method of sending data packets to a plurality of mobile radios, comprising:

sending at least one command to establish a broadcast session with the mobile radios;
broadcasting some of said data packets simultaneously to the mobile radios without receiving acknowledgments individually from the mobile radios;
transmitting others of said data packets individually to the mobile radios;
receiving an acknowledgment to the individually transmitted data packets from said mobile radios of receipt of both said broadcasted and said individually transmitted data packets; and broadcasting at least one command to disconnect the broadcast session with the mobile radios.

30. A method according to claim 29, wherein said data packets broadcast simultaneously to the mobile radios include all data packets in a sequence of data packets except at least one data packet last in the sequence of data packets.

31. A method according to claim 29, further including broadcasting individually to the mobile radios include only a last sub-set of data packets in a sequence of data packets.

32. A method according to claim 29, further including broadcasting a broadcast initiation command repeatedly to the mobile radios.

33. A method according to claim 29, wherein the step of broadcasting the initiation command occurs without receiving any acknowledgments from the mobile radios.

34. A method according to claim 29, further including broadcasting a broadcast disconnect command repeatedly to the mobile radios.

35. A method according to claim 29, wherein the step of broadcasting the disconnect command occurs without receiving any acknowledgments from the mobile radios.

36. A method according to claim 29, further including broadcasting a broadcast initiation command repeatedly to the mobile radios; and broadcasting a broadcast disconnect command repeatedly to the mobile radios.

37. A method according to claim 36, wherein the broadcasts of the initiation command and disconnect command occur without receiving any acknowledgments from the mobile radios.

38. A method according to claim 29, wherein the broadcasting of said some of the data packets include broadcasting complete personality information for each of the mobile radios with the exception of a logical identification code for each of the mobile radios; and the transmitting of the individual data packets includes the logical identification code for each of the mobile radios.

39. A method according to claim 29, wherein the step of receiving includes receiving a non-acknowledgement from at least one of the mobile radios whereupon said broadcasted data packets are re-submitted to the at least one mobile radio.

40. A communication manager for sending data packets to a plurality of mobile radios, comprising a transceiver to:

send at least one command to establish a broadcast session with the mobile radios;

broadcast some of said data packets simultaneously to the mobile radios without receiving acknowledgments individually from the mobile radios;

transmit others of said data packets individually to the mobile radios; and receive an acknowledgment to at least one of the individually transmitted data packets from said mobile radios of receipt of both the broadcasted and individually transmitted data packets.

* * * * *